United States Patent
Singh

(10) Patent No.: US 11,488,397 B2
(45) Date of Patent: Nov. 1, 2022

(54) VEHICLE CUSTOMIZATION SYSTEM

(71) Applicant: MAGNA ELECTRONICS INC., Auburn Hills, MI (US)

(72) Inventor: Harjeet Singh, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 636 days.

(21) Appl. No.: 15/341,046

(22) Filed: Nov. 2, 2016

(65) Prior Publication Data

US 2017/0124406 A1 May 4, 2017

Related U.S. Application Data

(60) Provisional application No. 62/249,469, filed on Nov. 2, 2015.

(51) Int. Cl.
*G06V 20/59* (2022.01)
*B60W 40/08* (2012.01)
*B60W 10/30* (2006.01)

(52) U.S. Cl.
CPC ........... *G06V 20/593* (2022.01); *B60W 10/30* (2013.01); *B60W 40/08* (2013.01); *B60W 2420/42* (2013.01)

(58) Field of Classification Search
USPC ....................................................... 348/148
See application file for complete search history.

(56) References Cited

U.S. PATENT DOCUMENTS

| | | |
|---|---|---|
| 6,690,268 B2 | 2/2004 | Schofield et al. |
| 6,693,517 B2 | 2/2004 | McCarthy et al. |
| 7,255,451 B2 | 8/2007 | McCabe et al. |
| 7,289,037 B2 | 10/2007 | Uken et al. |
| 7,580,795 B2 | 8/2009 | McCarthy et al. |
| 7,626,749 B2 | 12/2009 | Baur et al. |
| 7,914,187 B2 | 3/2011 | Higgins-Luthman et al. |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0129301 A1* | 5/2014 | Van Wiemeersch ... G07B 15/02 705/13 |
| 2014/0129942 A1* | 5/2014 | Rathod ............ H04N 21/44222 715/720 |
| 2014/0218529 A1 | 8/2014 | Mahmoud et al. |
| 2014/0336876 A1 | 11/2014 | Gieseke et al. |
| 2014/0375476 A1 | 12/2014 | Johnson et al. |

(Continued)

*Primary Examiner* — Mikhail Itskovich
(74) *Attorney, Agent, or Firm* — Honigman LLP

(57) ABSTRACT

A customization system for a vehicle includes a control operable to generate an output in a vehicle, with the output being a visual output, an audible output and/or a haptic output. An occupant recognition system is operable to recognize a particular occupant in the vehicle. The control accesses previously input occupant selections that are stored in a memory of the customization system. Responsive to the occupant recognition system recognizing a particular occupant of the vehicle, the control accesses previously input occupant selections associated with that particular occupant and, responsive to an accessed previously input occupant selection corresponding to a current date or vehicle status or location, the control generates a predetermined output for that particular occupant that corresponds to the current date or vehicle status or location.

20 Claims, 1 Drawing Sheet

(56) References Cited

U.S. PATENT DOCUMENTS

| | | |
|---|---|---|
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0124096 A1 | 5/2015 | Koravadi |
| 2015/0158499 A1 | 6/2015 | Koravadi |
| 2015/0203117 A1* | 7/2015 | Kelly ................ B60K 31/02 701/91 |
| 2015/0232030 A1 | 8/2015 | Bongwald |
| 2015/0251599 A1 | 9/2015 | Koravadi |
| 2015/0277735 A1 | 10/2015 | Gibson |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0034769 A1 | 2/2016 | Singh |
| 2016/0036917 A1 | 2/2016 | Koravadi et al. |
| 2016/0137126 A1 | 5/2016 | Fursich et al. |
| 2016/0162747 A1 | 6/2016 | Singh et al. |
| 2016/0210853 A1 | 7/2016 | Koravadi |
| 2017/0124406 A1 | 5/2017 | Singh |

\* cited by examiner

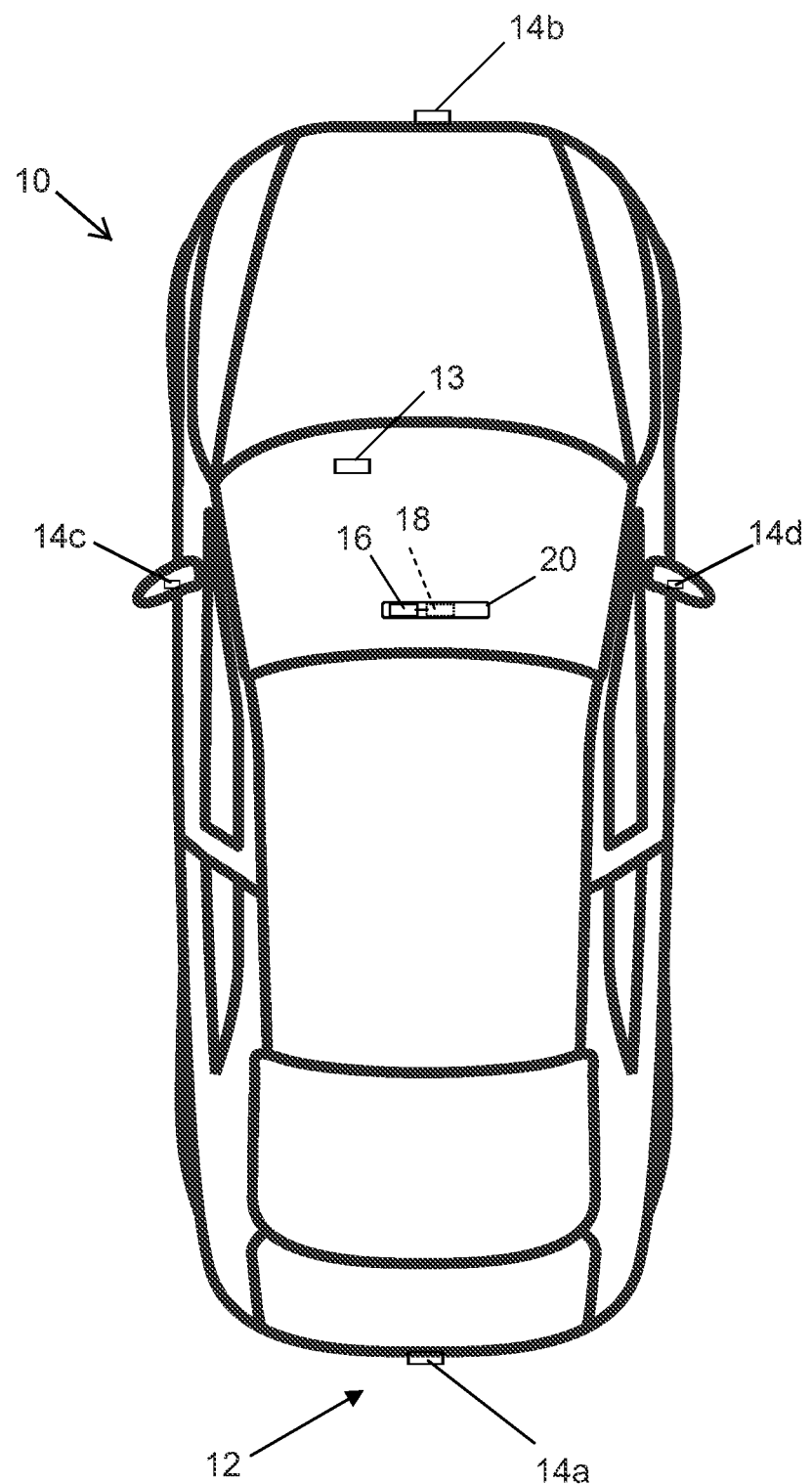

VEHICLE CUSTOMIZATION SYSTEM

CROSS REFERENCE TO RELATED APPLICATION

The present application claims the filing benefits of U.S. provisional application Ser. No. 62/249,469 filed Nov. 2, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Vehicles are commonly prepared to be personalized in limited manner such as the positions of the seating, steering wheel, mirrors and some comfort settings are bound to the individual driver by storing his or her settings and reproducing it as soon that driver reenters the vehicle. He or she may be identified by the key that is used, voice or body markers. Some vehicles may welcome the driver with a kind of welcome sound or short light show.

SUMMARY OF THE INVENTION

The present invention provides a driver assistance system or vision system or imaging system for a vehicle that provides custom or personalized displays and/or alerts/messages to the driver or occupant responsive to a determination of a particular time or date or the like that is meaningful to the driver or occupant. For example, a user of the vehicle may enter a particular date in a vehicle calendar (such as the user's birthday or anniversary or important holiday or the like) and the system, responsive to determining the presence of the user in the vehicle on that date, provides a display or alert or communication to the user (such as playing a particular song, such as "happy birthday" or displaying a particular video or particular images or the like). The system may utilize one or more cameras (preferably one or more CMOS cameras) to capture image data representative of images interior of the vehicle, such as of the driver's head region or passenger(s) head region(s) or the like, and an image processor may process captured image data to determine or recognize the driver and/or passenger(s), whereby an appropriate customized alert or display or communication may be generated for that recognized driver and/or passenger.

These and other objects, advantages, purposes and features of the present invention will become apparent upon review of the following specification in conjunction with the drawings.

BRIEF DESCRIPTION OF THE DRAWINGS

FIG. 1 is a plan view of a vehicle with a vision system that incorporates cameras in accordance with the present invention.

DESCRIPTION OF THE PREFERRED EMBODIMENTS

A vehicle vision system and/or driver assist system and/or alert system operates to capture images interior of the vehicle and may process the captured image data to display images and to detect objects at or near the vehicle and in the predicted path of the vehicle, such as to assist a driver of the vehicle in maneuvering the vehicle in a rearward direction. The data acquisition system, driver assist system and vision system may operate on separate devices having processors for processing input and output data, or may be operated on combined units or devices hereinafter referred to as the system or vision system. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an imaging system or vision system or driver assist system 12 that includes at least one interior facing camera 13 operable to capture image data of the driver and/or of an occupant in the vehicle (FIG. 1). The system 12 includes a control or electronic control unit (ECU) or processor 18 that is operable to process image data captured by the camera or cameras and may identify the driver or occupant (responsive to processing of image data captured by the interior viewing camera or cameras) or may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The control, responsive to recognition of the driver or passenger, may generate a customized output (such as an audible output or visual output) for that recognized driver or passenger, and the customized output may be responsive to one or more other inputs, such as a date or time or the like that may have been previously input by the driver or passenger. The data transfer or signal communication from the camera to the ECU may comprise any suitable data or communication link, such as a vehicle network bus or the like of the equipped vehicle.

The vehicle interior is becoming more and more relevant while the vehicle's driving properties shift out of scope as soon as the driver is more and more released from driving tasks such as when the vehicles are driven in a semi-autonomous or autonomous mode or manner.

The personalization may be extended to non-vehicle inherent functions such as altering the behavior on specific occasions. For example, the functions may be altered as date and time dependent, where displays or alerts or the like are provided on certain driver specific celebration days, such as, for example, the driver's (or other vehicle occupant's) birthday, the day at which the driver/occupant became a father or mother, the day at which the driver/occupant passed an important test or exam, an anniversary of the driver/occupant and/or the like. Optionally, the system may adjust displays or alerts or lights on certain holidays (and may do this irrespective of who is in the vehicle or only when a particular occupant or occupants is/are determined to be in the vehicle), such as by showing dark colors and orange or jumping jack-o'-lantern on Halloween or showing a frost pattern around the display borderlines when it is cold out or the like, or showing a marching band on the displays on Presidents Day or showing fireworks on the 4th of July or showing other displays on other national holidays.

Optionally, the system may adjust the display or alert or lights responsive to breaking news or the like (where the adjustment is news situational dependent). For example, the system may play sad music or jazz when bad news is received (such as when the driver's favorite football team has lost a game) or may play upbeat music or rock music when good news is received (such as when the driver's favorite football team has won a game) or the like.

Nowadays the behavior of the car is limited to haptic, audio or display content and driving behavior, beside malfunctions. Some OEMs have avatars implemented to communicate to the driver concerning vehicle functions, service functions and comfort functions. Some have primitive voice command sets implemented. Some have feedback learning algorithms in place to adapt to driver behavior, preferences or mood. For example, a vehicle's automatic driving may adapt to the driving and gear change behavior of a specific driver when the driver is driving on manual or non-automated.

As an aspect of the invention, an artificial intelligence (AI) may be implemented in the vehicle or connected to the vehicle (such as, for example, implemented in a cloud, or installed on a connected smart phone) for interacting with the vehicle occupants. The AI (or agent) may alter its behavior in interacting style and content on specific occasions or in specific contexts. Context understanding is very little achievable by classical software logic. The AI of the present invention may be done by a deep learning algorithm instead, capable to interpret from data and meta data which behavior, communication style and content may fit to a certain situation context. A more advanced AI may be capable for cognitive insights, such as, for example, understanding the content of a non-preset dialog. Non vehicle deep learning based applications such as human speech understanding for translation and individual command understanding are capable. Other strong deep learning based AIs may be found in automated stock market analyzing and bidding execution algorithms, which are buying and selling in fractions of seconds.

The system according to the present invention may tap into the driver's and/or vehicle occupants' (hereinafter referred as the user) personal data, which may be collected and stored in any kind of cloud or stored on a local device such as the user's cell phone, wearable, smart watch, a human body implant or the like. Also, the systems settings and the trained profile or properties (data, vectors, parameters) may be stored or backed-up in that way. The system may profile meta data out of the larger data by long term watching of the user's behavior and human behavior in general communicating and interacting with other human and machines.

In machine learning terms, the 'watching' may be an unsupervised learning using a predictor which prediction leads to either a positive feedback, when the prediction was generally correct or more correct than incorrect, or a negative feedback, when the prediction was generally incorrect or more incorrect than correct. That method may equate to a type of Reinforcement Learning. The unsupervised learning may also be a type of Clustering or Learning Belief Network. The AI may comprise a support vector machine, Bayesian learning, digital reasoning, emotion finite state machine or probabilistic relational models.

The system may learn the likes and dislikes of the user and his or her manners in reacting to certain situations in different contexts. Optionally, the system of the present invention may have a kind of avatar that is able to hold a dialog with the user. Optionally, the system may generate or have a kind of personality which emerges out of the learned behavior, which makes it unlike and different from other identical systems of its kind from different users. Optionally, the personality style may be user settable in the manner that the user prefers it, such as ranging from 'mother in law' or 'teacher' or 'best buddy' personality traits, depending on the mannerisms desired by the user. Optionally, the vehicle AI may be a subpart of a super AI which is aiding and interacting with the user in every kind of situations and places and the use of the user's vehicle is just one of these.

The technology in vehicles is increasing and the connectivity within the vehicle and the outside world is also increasing. The calendar in the vehicle is there, where a person can save his or her birthday or other important dates or holidays. The user can enter those dates when he/she bought the vehicle, or every time after the factory reset of the vehicle computers, and those dates are then saved for that particular user.

The information is saved in the vehicle calendar, so when the date for the birthday is there, the music is automatically played (responsive to determination that the birthday person has entered the vehicle) in the vehicle for some special theme, such as, for example, happy birthday piano tunes or the like. Optionally, the display of the vehicle may show a happy birthday logo or the like, with some special videos, which make the user feel special in the vehicle. Optionally, the interior lights of the vehicle may change their color(s) such as with the music or such as randomly in a disco fashion or the like. Optionally, a vibrator/massager of the seats may shake the user in a different manner and/or the side holder in the seats may be holding and releasing the user's back (if desired or previously input or selected by the user, such as when the date was entered). When entering the special dates, the user may select how the vehicle functions on that date, such as what songs are played and what is displayed and what seat or other accessories are controlled on that date).

Optionally, the inside view camera, which may be used for eye detection for drowsy detection and driver attention, may capture images, with the user's reaction at the same time when vehicle is celebrating the user's birthday (or other special day or holiday). Moreover, as connectivity is improving, such captured image data can be sent to the OEM (or other remote receiver), and the OEM can send the user an electronic document (such as a pdf document or the like) with the captured images showing how the vehicle celebrated the user's birthday. Furthermore, the OEM may send a coupon as a gift for the vehicle, for small things, like new perfume for the vehicle or a cleaning cloth for the vehicle dash board or the like.

The data can be entered with the camera viewing the user, so that the system recognizes the user's face and does not later initiate these celebrations or communications with the wrong driver or vehicle occupant. The system may utilize aspects of user customization systems and/or driver recognition systems of the types described in U.S. Pat. No. 7,914,187 and/or U.S. Publication Nos. US-2016-0137126; US-2015-0352953; US-2015-0296135; US-2015-0294169; US-2015-0277735; US-2015-0232030; US-2015-0092042; US-2015-0022664; US-2015-0015710; US-2015-0009010 and/or US-2014-0336876, which are hereby incorporated herein by reference in their entireties.

It is preferred to have this behavior of the vehicle occur during start-up of the vehicle and when the vehicle is traveling under a safe speed limit, or at the time the person reaches a particular destination and is parking the vehicle for the first time on his or her birthday (or other special day). Optionally, aspects of the system described above are suitable for use in determining or recognizing a passenger of the vehicle and, if the passenger has particular dates entered in the system, providing the appropriate celebration or treatment for that passenger. Optionally, the system or essentially the avatar may be responsive to a voice command, whereby a user may announce that it is a particular passenger's birthday (or other special day), and the system will perform accordingly for that particular passenger.

Optionally, it is envisioned that the stored information (input by the driver or passenger or user of the system) may include a location or locations that is/are important to the driver or passenger. Then, the control may generate an appropriate output or message when the vehicle arrives at that location (such as responsive to the input and a GPS system of the vehicle and optionally responsive to a particular date or time).

Thus, the present invention provides a customization system that comprises a control that is operable to access previously input user or occupant selections that are stored in a memory (such as manually input at an input of the vehicle or downloaded to a vehicle memory via the user's smartphone or the like). The inputs may comprise particular dates (such as birthday, anniversary, and/or the like) and/or geographical locations (such as the user's home or work or favorite restaurant or location or the like) and/or other status or criteria or condition of the vehicle or the like. The system is operable to generate an output associated with the respective inputs. The output may be a standard output for the respective input (such as playing "happy birthday" on the user's birthday) or may be an output selected by or generated by the user (such as a video or audio recording downloaded by the user to the system's memory, such as a video of the user's children wishing him/her a happy birthday, or the like). Responsive to a user or occupant recognition system recognizing a particular user or occupant of the vehicle (such as via video recognition of an occupant in the vehicle or via a user input by the user when the user enters the vehicle, where the user input may comprise a vocal command or touch input or the like that identifies the particular user or occupant to the system), the control accesses the previously input occupant selections associated with that particular user/occupant and, responsive to an accessed previously input occupant selection (such as the user's birthday or selected location or the like) corresponding to a current date or vehicle status or location, the control generates a predetermined output for that user/occupant that corresponds to the current date or vehicle status or location.

Optionally, the previously input occupant selections may include, for example, at least one date selected by the particular occupant. Responsive to the system recognizing or identifying the particular user or occupant and responsive to the accessed previously input selected date (for that user) corresponding to the current date, the control generates an output for the user or occupant that is associated with the previously input selected date. Optionally, the previously input occupant selections may include, for example, at least one geographical location selected by the user or occupant. Responsive to the system recognizing or identifying the particular occupant and responsive to the accessed previously input selected geographical location (for that user) corresponding to (or approaching) the current geographical location of the vehicle, the control generates another output for the occupant that is associated with the previously input geographical location.

Therefore, the present invention provides a customization system that the user or owner of the vehicle can customize for himself/herself and friends and family that often are occupants in the user's vehicle. The user can customize or select dates or locations or events or other criteria at which a message or output will be generated (for particular people that may be determined to be present in the vehicle) and the user can customize the message itself. Thus, the user can customize the system to have the vehicle generate a selected message for a selected situation or driving condition or date/time/location or the like. For example, the user could have the system play happy music when the vehicle arrives home (or other selected location) or could have the system play a pre-recorded message that the user downloaded or recorded at the vehicle when the vehicle arrives home (or other location). The pre-recorded message may be downloaded by the user when selecting the date/location/event for that message, or the system may provide a recording feature that may record a message that is associated with an input date or location or event or the like. The user may record the message when selecting or inputting the date or location or event, or may later record a custom message or download a custom message for a previously input date or location or event.

Optionally, the vision system may include at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which capture images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A customization system for a vehicle, said customization system comprising:

an electronic control unit disposed in the vehicle;

memory that stores occupant information associated with at least one person;

at least one camera disposed in the vehicle so as to have a field of view that encompasses a head region of a person in the vehicle, said at least one camera capturing image data;

said electronic control unit comprising an image processor;

image data captured by said at least one camera is provided to said electronic control unit for processing by said image processor;

when a particular person is present in the vehicle and in the field of view of said at least one camera, and via processing by said image processor of image data captured by said at least one camera and provided to said electronic control unit, said electronic control unit recognizes that particular person present in the vehicle as being a particular person having occupant information stored in the memory;

responsive to said electronic control unit recognizing the particular person present in the vehicle, said electronic control unit accesses the occupant information that is stored in the memory and that is associated with that particular person;

the stored occupant information includes at least one selected from the group consisting of (i) a date associated with the respective particular person and (ii) a geographical location associated with the respective particular person;

responsive to determination by said electronic control unit that (i) a stored date of the accessed stored occupant information corresponds to a current date or (ii) a geographical location of the accessed stored occupant information corresponds to a current geographical location of the vehicle, said electronic control unit generates an output for that particular person that corresponds to the current date or current geographical location of the vehicle; and the output generated by said electronic control unit comprises an output selected from the group consisting of (i) a visual output displayed on a display screen viewable by the particular person present in the vehicle, (ii) an audible output generated by an audio device in the vehicle and (iii) a haptic output generated by a haptic device in contact with the particular person present in the vehicle.

2. The customization system of claim 1, wherein the recognized particular person is a driver of the vehicle.

3. The customization system of claim 1, wherein the output comprises a visual output displayed on a display screen viewable by the particular person present in the vehicle, and wherein the visual output comprises displayed video images derived from image data captured by said at least one camera.

4. The customization system of claim 1, wherein the recognized particular person is a passenger of the vehicle.

5. The customization system of claim 1, wherein the output comprises a haptic output generated by a haptic device in contact with the particular person present in the vehicle.

6. The customization system of claim 1, wherein the occupant information stored in the memory includes a birth date of the particular person, and, responsive to said electronic control unit recognizing the particular person present in the vehicle and responsive to determination by said electronic control unit that the accessed stored birth date corresponds to the current date, the output generated by said electronic control unit comprises a birthday message for that particular person present in the vehicle.

7. The customization system of claim 6, wherein the birthday message comprises playing an audible song for that particular person present in the vehicle.

8. The customization system of claim 6, wherein the birthday message comprises playing a video for viewing by that particular person present in the vehicle.

9. The customization system of claim 6, wherein said at least one camera in the vehicle captures image data of that particular person present in the vehicle when said electronic control unit generates the birthday message.

10. The customization system of claim 1, wherein the occupant information stored in the memory includes a geographical location associated with the particular person, and, responsive to said electronic control unit recognizing that particular person present in the vehicle and responsive to determination by said electronic control unit that the accessed stored geographical location corresponds to the current geographical location of the vehicle, the output generated by said electronic control unit comprises a message for that particular person present in the vehicle that is associated with the stored geographical location.

11. The customization system of claim 1, wherein said electronic control unit generates the output responsive in part to at least one selected from the group consisting of (i) the vehicle not moving, (ii) the vehicle moving below a threshold speed and (iii) the vehicle arriving at a destination.

12. The customization system of claim 1, wherein the occupant information stored in the memory comprises a date associated with the particular person, and said electronic control unit accesses stored outputs that are stored by the particular person, and said electronic control unit generates the output based on a stored output associated with that particular person and the current date.

13. The customization system of claim 1, wherein said electronic control unit utilizes a user input and recognizes the particular person present in the vehicle responsive to the user input by that particular person present in the vehicle.

14. A customization system for a vehicle, said customization system comprising:

an electronic control unit disposed in the vehicle;

memory that stores occupant information associated with at least one person;

at least one camera disposed in the vehicle so as to have a field of view that encompasses a head region of a person in the vehicle, said at least one camera capturing image data;

said electronic control unit comprising an image processor;

image data captured by said at least one camera is provided to said electronic control unit for processing by said image processor;

when a particular person is present in the vehicle and in the field of view of said at least one camera, and via processing by said image processor of image data captured by said at least one camera and provided to said electronic control unit, said electronic control unit recognizes that particular person present in the vehicle as being a particular person having occupant information stored in the memory;

responsive to said electronic control unit recognizing the particular person present in the vehicle, said electronic control unit accesses the occupant information that is stored in the memory and that is associated with that particular person;

the stored occupant information includes at least one selected from the group consisting of (i) a date associated with the respective particular person and (ii) a geographical location associated with the respective particular person;

responsive to determination by said electronic control unit that (i) a stored date of the accessed stored occupant information corresponds to a current date or (ii) a geographical location of the accessed stored occupant information corresponds to a current vehicle geographical location, said electronic control unit generates an output for that particular person that corresponds to the current date or current vehicle geographical location; and the output generated by said electronic control unit comprising an output that is stored in memory for that particular person and that is associated with the accessed stored occupant information that corresponds to the current date or current vehicle geographical location.

15. The customization system of claim 14, wherein the stored occupant information includes a date associated with the particular person, and wherein, responsive to said electronic control unit recognizing the particular person and responsive to the accessed stored date corresponding to the current date, the output generated by said electronic control unit comprises an output derived from a stored message for that particular person that is associated with the stored date.

16. The customization system of claim 14, wherein said at least one camera in the vehicle captures image data of the particular person present in the vehicle when said electronic control unit generates the output.

17. The customization system of claim 14, wherein the stored occupant information includes a geographical location associated with the particular person, and wherein, responsive to said electronic control unit recognizing the particular person and responsive to the accessed stored geographical location corresponding to the current vehicle geographical location, the output generated by said electronic control unit comprises an output derived from a stored message for that particular person that is associated with the accessed stored geographical location.

18. A customization system for a vehicle, said customization system comprising:
- an electronic control unit disposed in the vehicle;
- memory that stores occupant information associated with at least one person;
- at least one camera disposed in the vehicle so as to have a field of view that encompasses a head region of a person in the vehicle, said at least one camera capturing image data;
- said electronic control unit comprising an image processor;
- image data captured by said at least one camera is provided to said electronic control unit for processing by said image processor;
- when a particular person is present in the vehicle and in the field of view of said at least one camera, and via processing by said image processor of image data captured by said at least one camera and provided to said electronic control unit, said electronic control unit recognizes that particular person present in the vehicle as being a particular person having occupant information stored in the memory;
- responsive to said electronic control unit recognizing the particular person present in the vehicle, said electronic control unit accesses the occupant information that is stored in the memory and that is associated with that particular person;
- the stored occupant information includes at least a date associated with the particular person, and, responsive to said electronic control unit recognizing the particular person present in the vehicle and responsive to determination by said electronic control unit that the accessed stored date corresponds to the current date, said electronic control unit generates an output for that particular person that is associated with the accessed stored date; and
- the stored occupant information includes at least one geographical location associated with the particular person, and, responsive to said electronic control unit recognizing the particular person and responsive to the accessed stored geographical location corresponding to the current geographical location of the vehicle, said electronic control unit generates another output for that particular person that is associated with the accessed stored geographical location.

19. The customization system of claim 18, wherein said at least one camera in the vehicle captures image data of that particular person present in the vehicle when said electronic control unit generates the output.

20. The customization system of claim 18, wherein said electronic control unit generates the output responsive in part to at least one selected from the group consisting of (i) the vehicle not moving, (ii) the vehicle moving below a threshold speed and (iii) the vehicle arriving at a destination.

* * * * *